Figures 1, 2:
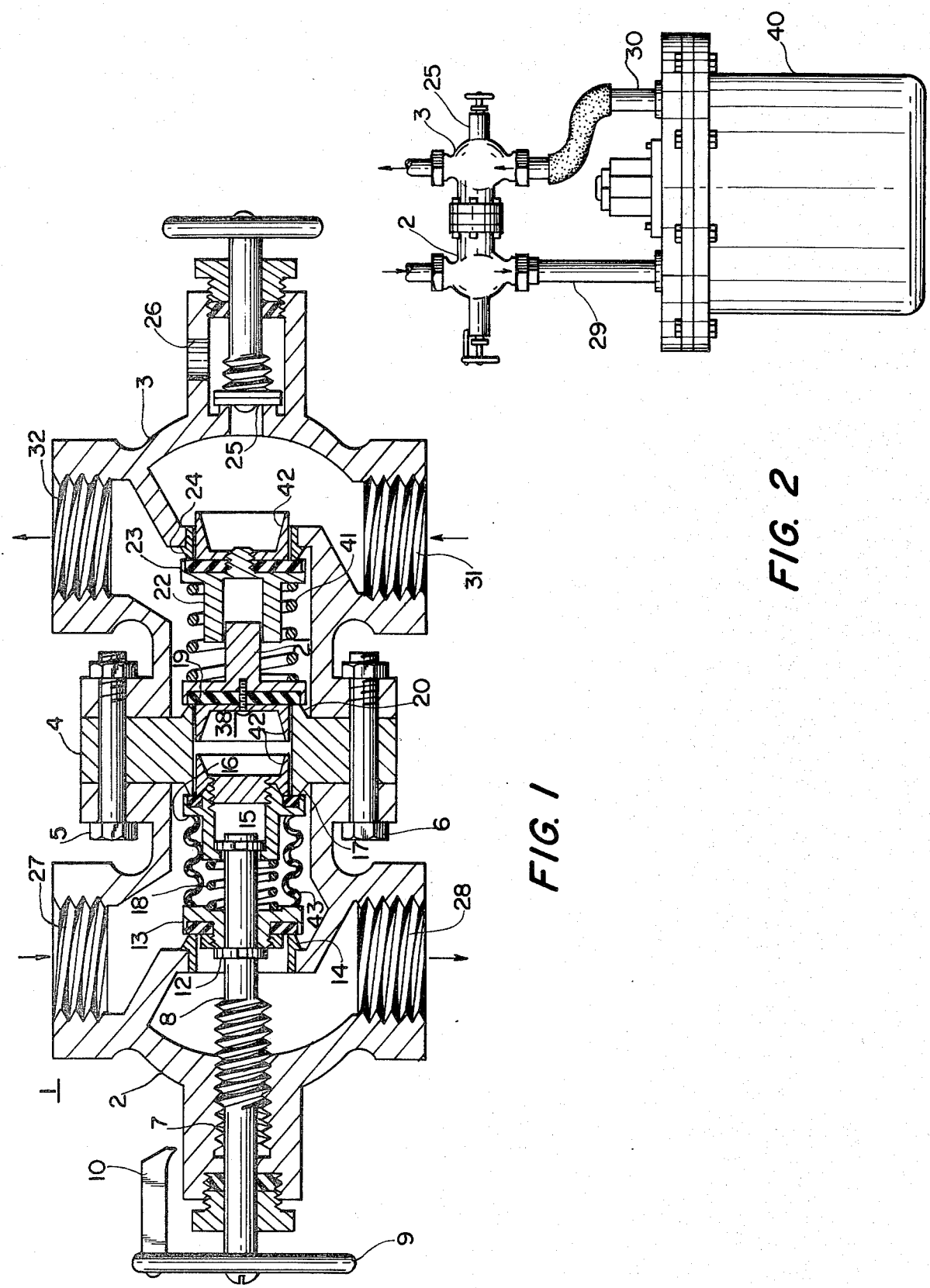

United States Patent [19]

Sullivan

[11] 4,130,133
[45] Dec. 19, 1978

[54] BYPASS VALVING FLUID CONTROL ARRANGEMENT

[75] Inventor: Timothy J. Sullivan, Butte, Mont.

[73] Assignee: The Sullivan Valve & Engineering Company, Butte, Mont.

[21] Appl. No.: 741,116

[22] Filed: Nov. 11, 1976

[51] Int. Cl.² .................................................. F16K 11/18
[52] U.S. Cl. .............................. 137/599.1; 137/512.5; 137/627.5; 137/636; 210/135; 210/136; 210/420
[58] Field of Search .................. 137/110, 512.5, 599.1, 137/636, 332, 627.5; 210/130, 132, 133, 135, 136, 340, 341, 418, 420–424, 428, 434

[56] References Cited

U.S. PATENT DOCUMENTS

| 502,583 | 8/1893 | Rankine | 210/418 X |
|---|---|---|---|
| 3,025,881 | 3/1962 | Freeman | 137/627.5 |
| 3,157,191 | 11/1964 | Garrett | 137/332 |
| 3,920,002 | 11/1975 | Dye | 137/512.5 X |

FOREIGN PATENT DOCUMENTS 383004 12/1907 France ............................ 137/599.1

Primary Examiner—Robert G. Nilson
Attorney, Agent, or Firm—Burns, Doane, Swecker & Mathis

[57] ABSTRACT

A bypass valving fluid control arrangement for a fluid system including a fluid treatment device which permits the removal of the fluid treatment device from the system without interrupting system operation and wherein the bypass valving control comprises a single unitary structure having a single manual control means and valving operation is responsive to pressure conditions within the fluid control arrangement.

10 Claims, 2 Drawing Figures

BYPASS VALVING FLUID CONTROL ARRANGEMENT

BACKGROUND OF THE INVENTION

The present invention relates to a bypass valving fluid control arrangement which is employed in a fluid system including a fluid treatment device which may require repair, replacement or other servicing from time to time. For efficient operation of an overall plant, it is necessary to be able to remove the treatment device from service for necessary service without interrupting the operation of the overall plant. In the past, this has been accomplished by providing the treatment device with a plurality of valves, each performing a single function such as closing the inlet, closing the outlet and then opening a bypass valve around the treatment device which might then be removed from the system.

It would be desirable to provide a single bypass valving fluid control arrangement for performing the various valving functions so that the above mentioned operations could be more efficiently performed. One approach to the problem is disclosed in Burkhalter patent No. 3,669,148. While the patent discloses an advance in the art, it is not entirely satisfactory because it lacks desirable automatic features. The present invention satisfies this requirement.

SUMMARY OF THE INVENTION

Accordingly, it is an object of the present invention to provide an improved bypass valving fluid control arrangement for connection with a fluid system wherein the operating condition of the control arrangement is responsive to the pressure conditions within the assembly.

It is a further object of the present invention to provide an improved bypass valving control arrangement having a unitary structure and unitary manual control.

Another object of the present invention is to provide an improved bypass valving fluid control wherein a single valve therein operatively controls the operation of other valves in the fluid control assembly.

These and other objects will be apparent from an examination of the following description and the accompanying drawings.

Reference is made to the accompanying drawing wherein:

FIG. 1 is a cross sectional view of the bypass valving fluid control arrangement; and FIG. 2 shows the bypass valving control arrangement in conjunction with a fluid treatment device.

Referring to the drawings, FIG. 1 shows a cross sectional view of the bypass valving fluid control arrangement of the present invention wherein a three part casing 1 consists of an upper valve housing 2, a lower valve housing 3 and a spacing ring 4 which are fastened together by bolts 5, 6 to form a unitary housing. Threads 7 are provided in the upper housing to cooperate with threaded valve stem 8 which is provided at its upper end with hand wheel 9 having indicator pointer 10 mounted thereon. Valve stem 8 is provided with a first lock ring 12 which is adapted to apply a downward force only on valve 13 which coacts with valve seat 14. Valve stem 8 is provided with a second lock ring 15 which is adapted to apply an upward force only to valve 16, it being noted that valves 13 and 16 are slidably mounted on valve stem 8. Valve 16 coacts with valve seat 17. Spring 18 is provided to force valves 13 and 16 apart. A fluid passage 38 connects valve 16 to valve 19 in lower housing 3. Valve 19 coacts with valve seat 20. Valve 19 is provided with a stem 21 which mates slidably with a cylindrical portion 22 of valve 23 which coacts with valve seat 24. Valves 23 and 19 are forced apart by spring 41. The housing is provided with a drain valve 25 so that fluid in the housing might be drained out through port 26.

In use, the bypass valving fluid control is used with a fluid treatment device 40 which may be for example, a steam trap, as shown in FIG. 2. Inlet port 27 of the upper valve is connected to a pressure source (not shown) such as a steam boiler. With valve stem 8 in its open position, as indicated by pointer 10, lock ring 12 applies downward force on valve 13 to separate it from valve seat 14 to open the passage to outlet port 28 so that fluid flows through pipe 29 to steam trap 40 and then up through pipe 30 to inlet port 31 of the lower housing 3. The fluid exerts an upward force on the bottom surface of valve 23 to separate it from valve seat 24 to allow the fluid to pass through outlet port 32 of the lower housing 3 to a load device (not shown) where the fluid may be utilized.

When the fluid treatment device is to be taken out of service, hand wheel 9 is turned to closed position, as indicated by pointer 10; lock ring 15 moves up to cause valve 16 to separate from valve seat 17 and spring 18 closes valve 13 on valve seat 14. With valve 16 open, the pressure fluid from inlet port 27 enters passage 28 and applies pressure on valve 19 to cause it to separate from valve seat 20. Simultaneously, spring 41 closes valve 23 on valve seat 24, so that the pressure fluid in passage now flows out through outlet port 32 to the load device and the flow to the treatment device 40 has been shut off and it can be removed for service.

As an added feature, valves 15, 19 and 23 may be provided with vanes which will rotate these valves when they are open and the vanes interact with the fluid flow to provide the valves with a self cleaning capability. Also, the space between valves 13 and 16 may be enclosed by sylphon 43 to eliminate leakage between these valves.

It is apparent that this bypass valving fluid control arrangement is very simple to operate, compact and reliable since its operation is responsive to the condition of the fluid being controlled.

While a preferred embodiment has been disclosed, it is apparent that modifications within the spirit of the present invention will be obvious to the person skilled in the art and it is understood that the present invention is limited only by the appended claims.

What is claimed is:

1. A bypass valving fluid control arrangement for cooperation with a fluid treatment device by which fluid from a pressure fluid source is treated and made available to its point of use, said arrangement comprising a body having a plurality of chambers;
   a first inlet adapted to be connected to said fluid source and opening into a first of said chambers;
   a first valve means within said first chamber controlling the flow of fluid from said first inlet to a first outlet which is adapted to be connected to said fluid treatment device;
   a second of said chambers in said housing;
   a second valve means for controlling the flow of fluid from said first chamber to said second chamber;

said first and second valve means being mounted on and controlled by a common valve stem;

manual means for controlling the operation of said valve stem;

a third of said chambers in said housing;

a second inlet adapted to be connected to said treatment device and opening into said third chamber;

a second outlet from said third chamber adapted to be connected to said point of use;

third valve means in said third chamber controlling the flow of fluid from said second inlet to said second outlet;

a fourth valve means for controlling the flow of fluid from said second chamber to said third chamber;

said third and fourth valve means being mounted for relative motion therebetween;

first spring means, said first spring means being mounted with respect to both said third and fourth valve means for biasing both said third and fourth valve means to closed position;

both said third and fourth valve means being provided with fluid pressure responsive surfaces either of which responsive to a predetermined pressure is operative to open its respective valve means against the force of said spring means;

whereby when said manual means is actuated to open said first valve means and to close said second valve means fluid pressure is supplied to said treatment device and the resulting pressure in said third chamber opens said third valve means to connect said second inlet to said second outlet and when said manual means is actuated to close said first valve means and to open said second valve means the resulting pressure in said second chamber opens said fourth valve means to bypass said treatment device, the arrangement being further characterized in that said first and second valve means are slidably mounted on said valve stem, a second spring means being mounted on said valve stem between said first and second valve means and biasing said first and second valve means away from each other and against stops mounted on said valve stem, whereby said first and second valve means are positively actuated in one direction by said valve stem and its respective stop and in the opposite direction by said second spring means.

2. A bypass valving fluid control arrangement as set forth in claim 1 wherein said third chamber is provided with a drain valve to facilitate the servicing of said treatment device.

3. A bypass and backflow preventing valving safety fluid control arrangement for cooperation with a fluid treatment device by which fluid from a pressure fluid source is treated and made available to its point of use and wherein fluid flow is automatically arrested from the fluid treatment device flow path when the fluid treatment device is by-passed, said arrangement comprising a body having a plurality of chambers;

a first inlet adapted to be connected to said fluid source and opening into a first of said chambers;

a first valve means within said first chamber controlling the flow of fluid from said first inlet to a first outlet which is adapted to be connected to said fluid treatment device;

a second of said chambers in said housing;

a second valve means for controlling the flow of fluid from said first chamber to said second chamber;

said first and second valve means being mounted on and controlled by a common valve stem;

manual means for controlling the operation of said vave stem;

a third of said chambers in said housing;

a second inlet adapted to be connected to said treatment device and opening into said third chamber;

a second outlet from said third chamber adapted to be connected to said point of use;

automatic means responsive to the pressures in said second and third chambers for effectuating bypass around said treatment device and preventing flow to said treatment device comprising third valve means in said third chamber controlling the flow of fluid from said second inlet to said second outlet;

fourth valve means for controlling the flow of fluid from said second chamber to said third chamber;

said third and fourth valve means being mounted for relative motion therebetween;

first spring means, said first spring means being mounted with respect to both said third and fourth valve means for biasing both said third and fourth valve means to closed position;

both said third and fourth valve means being provided with fluid pressure surfaces each of which is responsive to a predetermined pressure and operative to open its respective valve means against the force of said first spring means;

the fluid pressure responsive surface of said third valve means being responsive to the pressure at said second inlet and the fluid pressure surface of said fourth valve means being responsive to the pressure in said second chamber;

whereby when said manual means is actuated to open said first valve means and to close said second valve means fluid pressure is applied to said treatment device and the resulting pressure in said third chamber automatically opens said third valve means to connect said second inlet to said second outlet and when said manual means is actuated to close said first valve means and to open said second valve means the resulting pressure in said second chamber automatically opens said fourth valve means to bypass said treatment device, said arrangement being further characterized in that said first and second valve means are slidably mounted on said valve stem, a second spring means being mounted on said valve stem between said first and second valve means and biasing said first and second valve means away from each other and against stops mounted on said valve stem, whereby said first and second valve means are positively actuated in one direction by said valve stem and in the opposite direction by said second spring means.

4. A bypass valving fluid control arrangement as set forth in claim 3 wherein said third chamber is provided with a drain valve to facilitate the servicing of said treatment device.

5. A valve mechanism comprising:

a body including
first, second, and third chambers,
a first inlet adapted for connection to a fluid source and opening into said first chamber, a first outlet from said first chamber and adapted to be connected to the entrance of a fluid receiving mechanism, a second inlet adapted for connection to an exit of said fluid receiving mechanism and opening into said third chamber, a second outlet from said third chamber and adapted for connection to a fluid delivery point, said second chamber disposed to communicate said first chamber with said third chamber through which fluid may flow to by-pass the fluid receiving mechanism, and a passage communicating said second inlet with ambient pressure, auxiliary valve means in said passage for selectively opening and closing said passage, check valve means in said third chamber, said check valve means being responsive to fluid pressure in said second chamber for opening communication between said first and third chambers and closing said second inlet from said third chamber, and responsive to fluid pressure at said second inlet for opening communication between said second inlet and said second outlet and closing said second chamber from said third chamber, and control valve means for controlling fluid flow between said fluid source and said first outlet and between said fluid source and said second chamber, said control valve means comprising first and second valves arranged for relative movement within said first chamber, said first valve arranged to selectively open and close said first outlet relative to said first chamber, and said second valve arranged to open and close said second chamber relative to said first chamber, biasing means for biasing said first valve to a position closing said first outlet for biasing said second valve to a position closing said second chamber, and an axially displaceable control stem operably connected to both of said first and second valves, said stem being axially displaceable in one direction from a neutral position to move said first valve to a position opening said first outlet, while said second valve remains biased to a position closing said second chamber, and in another direction from said neutral position to move said second valve to a position opening said second chamber, while said first valve is biased to a position closing said first outlet, said biasing means arranged for urging said first valve to a position closing said first outlet and urging said second valve to a position closing said second chamber when said stem is in said neutral position.

6. A valve mechanism according to claim 5 wherein said biasing means comprises a spring disposed between said first and second valves such that when either of said valves is moved to its open position said spring is flexed to increase the closing force applied against the other valve.

7. A bypass valve mechanism for use with a fluid treatment device by which fluid from a pressure fluid source is treated and made available to a point of use, said arrangement comprising:

a body including first, second, and third chambers, a first inlet adapted to be connected to said fluid source and opening into said first chamber, a first valve means within said first chamber controlling the flow of fluid from said first inlet to a first outlet which is adapted to be connected to said fluid treatment device, a second valve means for controlling the flow of fluid from said first chamber to said second chamber, said first and second valve means being movable relative to one another, a second inlet adapted to be connected to said treatment device and opening into said third chamber, a second outlet from said third chamber adapted to be connected to said point of use, third valve means in said third chamber controlling the flow of fluid from said second inlet to said second outlet, a fourth valve means for controlling the flow of fluid from said second chamber to said third chamber, said fourth valve means being movable relative to said third valve means, biasing means for biasing each of said third and fourth valve means to closed positions, both said third and fourth valve means being provided with fluid pressure responsive surfaces either of which responsive to a predetermined pressure is yieldable to open its respective valve means against the force of said biasing means, said third valve means being yieldable in response to fluid pressure at said second inlet, said fourth valve means being yieldable in response to fluid pressure in said second chamber, control means, including a manually actuable, axially movable control stem operably connected to both of said first and second valve means for opening said first valve means only when said second valve means is closed to communicate said first inlet with said first outlet, and opening said second valve means only when said first valve means is closed to communicate said first inlet with said second chamber whereupon said fourth valve means opens to communicate said second chamber with said second outlet so that fluid by-passes said treatment device, said control stem being movable to a neutral position in which both said first and second valve means are closed.

8. A valve mechanism according to claim 7 further including a spring disposed between said first and second valve means to urge said first and second valve means to closed positions, said spring being flexed in response to opening of one of said first and second valve means in a manner increasing the closing force applied against the other of said first and second valve means.

9. A valve mechanism according to claim 7 wherein said body further includes a passage communicating said second inlet with ambient pressure, and auxiliary valve means in said passage for selectively opening and closing said passage.

10. A valve mechanism comprising a body including:

first, second, and third chambers, a first inlet adapted for connection to a fluid source and opening into said first chamber, a first outlet from said first chamber and adapted to be connected to the entrance of a fluid receiving mechanism, a second inlet adapted for connection to an exit of said fluid receiving mechanism and opening into said third chamber, a second outlet from said third chamber and adapted for connection to a fluid delivery point, said second chamber disposed to communicate said first chamber with said third chamber through which fluid may flow to by-pass the fluid receiving mechanism, check valve means in said third chamber, said check valve means comprising first and second check valve elements and spring means biasing said first check valve element to a position closing said second chamber relative to said second chamber and biasing second check valve element to a position closing said third chamber relative to said second inlet, said first check valve elememt being responsive to fluid pressure in said second chamber for opening communication between said first and third chambers with said second inlet remaining closed relative to said third chamber by said second check valve element, and said second check valve element being responsive to fluid pressure at said second inlet for opening communication between said second inlet and said second outlet with said second chamber remaining closed relative to said third chamber by said first check valve element, and control valve means for controlling fluid flow between said fluid source and said first outlet and between said fluid source and said second chamber, said control valve means comprising first and second valves arranged for relative movement within said first chamber, said first valve arranged to selectively open and close said first outlet relative to said first chamber, and said second valve arranged to open and close said second chamber relative to said first chamber, biasing means for biasing said first valve to a position closing said outlet and for biasing said second valve to a position closing said second chamber, and an axially displaceable control stem operably connected to both of said first and second valves, said stem being axially displaceable in one direction from a neutral position to move said first valve to a position opening said first outlet, while said second valve remains biased to a position closing said second chamber, and in another direction from said neutral position to move said second valve to a position opening said second chamber, while said first valve is biased to a position closing said first outlet, said biasing means arranged for urging said first valve to a position closing said first outlet and urging said second valve to a position closing said second chamber when said stem is in said neutral position, such that only one of said first and second valves can be opened at one time.

* * * * *